US012799021B2

(12) United States Patent
Zhou et al.

(10) Patent No.: US 12,799,021 B2
(45) Date of Patent: Nov. 17, 2026

(54) GLASS MATERIAL, AND PREPARATION METHOD AND PRODUCT THEREOF

(71) Applicant: CHANGSHU JIAHE DISPLAY TECHNOLOGY CO., LTD, Suzhou (CN)

(72) Inventors: Weiwei Zhou, Suzhou (CN); Fujun Zhang, Suzhou (CN); Qihang Tian, Suzhou (CN); Jihong Zhang, Suzhou (CN)

(73) Assignee: CHANGSHU JIAHE DISPLAY TECHNOLOGY CO., LTD, Suzhou (CN)

( * ) Notice: Subject to any disclaimer, the term of this patent is extended or adjusted under 35 U.S.C. 154(b) by 1095 days.

(21) Appl. No.: 17/311,273

(22) PCT Filed: Apr. 21, 2021

(86) PCT No.: PCT/CN2021/088560
§ 371 (c)(1),
(2) Date: Jun. 4, 2021

(87) PCT Pub. No.: WO2022/193400
PCT Pub. Date: Sep. 22, 2022

(65) Prior Publication Data

US 2023/0069922 A1 Mar. 9, 2023

(30) Foreign Application Priority Data

Mar. 18, 2021 (CN) ........................ 202110278335.X

(51) Int. Cl.
*C03C 10/00* (2006.01)
*C03B 19/02* (2006.01)
(Continued)

(52) U.S. Cl.
CPC .............. *C03C 10/00* (2013.01); *C03B 19/02* (2013.01); *C03B 23/033* (2013.01); *C03B 32/02* (2013.01);
(Continued)

(58) Field of Classification Search
CPC .............................. C03B 19/02; C03B 23/033
See application file for complete search history.

(56) References Cited

U.S. PATENT DOCUMENTS

2017/0144921 A1* 5/2017 Beall ........................ C03C 4/02

FOREIGN PATENT DOCUMENTS

CN 106242299 A 12/2016
CN 107001120 A 8/2017
(Continued)

OTHER PUBLICATIONS

CN 110143759 machine translation, Liang Xin-hui et al., A high strength transparent microcrystalline glass, Aug. 2019 (Year: 2019).*
(Continued)

*Primary Examiner* — Queenie S Dehghan
(74) *Attorney, Agent, or Firm* — MUNCY, GEISSLER, OLDS & LOWE, P.C.

(57) ABSTRACT

The present invention discloses a glass material, and a preparation method and a product thereof. The glass material contains a lithium salt crystalline phase and a phosphate crystalline phase. For the entire material, the crystallinity is 40-95%, the lithium salt crystalline phase accounts for 40-90 wt % of the entire material, and the phosphate crystalline phase accounts for 2-15 wt % of the entire material, wherein the lithium salt crystalline phase is one or more of lithium silicate, lithium disilicate and petalite, and the phosphate crystalline phase is aluminum phosphate or/and aluminum metaphosphate. After the glass material of the present invention is toughened, the Vickers hardness (Hv) is 900
(Continued)

kgf/$mm^2$ or above. The glass material or a substrate of the present invention is suitable for protective members such as mobile terminal equipment and optical equipment and has high hardness and strength. Furthermore, the present invention may also be used for other decorations such as outer frame members of portable electronic equipment.

3 Claims, 6 Drawing Sheets

(51) Int. Cl.

| | |
|---|---|
| ***C03B 23/033*** | (2006.01) |
| ***C03B 32/02*** | (2006.01) |
| ***C03C 4/02*** | (2006.01) |
| ***C03C 21/00*** | (2006.01) |

(52) U.S. Cl.
CPC .............. *C03C 4/02* (2013.01); *C03C 21/002* (2013.01); *C03C 2204/00* (2013.01)

(56) References Cited

FOREIGN PATENT DOCUMENTS

| | | | | |
|---|---|---|---|---|
| CN | 107845078 A | | 3/2018 | |
| WO | WO-0034196 A2 | * | 6/2000 | ............... A61K 6/78 |

OTHER PUBLICATIONS

CN 110510879 machine translation, Yuan et al., Microcrystalline Glass Product, Nov. 2019 (Year: 2019).*

* cited by examiner

GLASS MATERIAL, AND PREPARATION METHOD AND PRODUCT THEREOF

TECHNICAL FIELD

The present invention belongs to the technical field of glass ceramics and particularly relates to glass ceramics with excellent mechanical properties, and a preparation method and a product thereof.

BACKGROUND ART

In the context of today's information interconnection, 5G communication has become the mainstream in the industry. By employing the 5G communication technology, a frequency of a transmission signal is raised to a higher frequency. If a traditional metal back cover is employed, transmission of a signal is influenced due to occurrence of severe dielectric loss. Moreover, the development of a wireless charging technology also sets higher requirements for a cover plate of a mobile terminal. At present, a high-alumina glass material is employed as a back cover material for a main cover plate of a mobile phone.

A glass material is generally employed as a screen and back cover material for mobile terminal electronic equipment to exert the protection effect to corresponding electronic equipment. However, with the increase of the size of a display screen of the mobile terminal, glass on the surface becomes more and more likely to be broken and scratched. The mechanical properties of the existing high-alumina glass cannot meet the demand of development of the mobile terminals, so that the mechanical properties of a glass protective layer of an electronic product need to be further improved. Furthermore, as the high-alumina glass is high in aluminum content and melting temperature, energy consumption is large, and the cost of a product is high.

Starting from implementation of controllable preparation in glass ceramics by Corning Incorporated of America in the 1950s, the glass ceramics have started to attract attention from related researchers. The glass ceramics combine the characteristics of glasses and ceramics.

In presence of crystalline phases, microcracks on the surface or insides can be prevented from further propagating, or deflect without easily propagating, so that the strength and the mechanical properties of the glass ceramics are greatly improved. Compared with original glasses, the glass ceramics have the advantages that the mechanical strength, the thermal shock resistance and the chemical stability are remarkably improved, the thermal expansion coefficient is adjustable at the same time and the like. The glass ceramics, as an important structural and functional material, play an important role in industrial production and daily life. Due to a structure of coexistence of a glass phase and a crystalline phase, the glass ceramics have more excellent performance than the high-alumina glasses.

Patent CN106242299A has disclosed glass ceramics and a substrate with the glass ceramics as a base material. Although a sufficient compressive stress value may be obtained through an ion exchange process, a relatively deep stress layer cannot be formed, so that the glass ceramics are easily damaged in the dropping process and cannot be used as a front cover or a back cover of the mobile phone.

Patent CN107845078A has provided lithium disilicate-containing glass ceramics and a substrate. However, in the composition of the lithium disilicate-containing glass ceramics, contents of $Al_2O_3$ and $Na_2O$ are too high, uniformly precipitating glass ceramics cannot be obtained in the microcrystallization process although high strength of the surface may be achieved through ion strengthening, so that the transmittance and the strength of the glasses are lowered.

Patent CN107001120A has provided transparent glass ceramics with petalite and lithium disilicate as main crystalline phases. However, due to too high lithium content in the composition, a glass process window prepared from the transparent glass ceramics is relatively narrow and is easily opacified and devitrified in the operation process. Existing glass materials applied to the mobile terminals are single in type and are difficult to meet the demands on individuality development of users. In an industrial preparation coloring method, the surface of glasses is sprayed with an organic material color layer, but a coating may age and even fall off over time, and thus the coloring effect naturally becomes poor. With social and economic development, interest is growing in individualization products.

However, colored glasses colored based on a glass substrate have the advantages of uniform and stable coloring and simple preparation flow.

To sum up, the glass materials applied to the mobile terminals at present have the following problems:

1. Performance aspect: the high-alumina glasses are relatively low in mechanical properties, low in hardness, intolerant in scratching, large in melting difficulty and high in cost and cannot meet the demands on a large screen and a light weight of the mobile terminals; and the existing glass ceramic material also has the problems of large brittleness, difficulty in obtaining relatively large depth of the stress layer, uneven crystallization, easiness in opacification and the like.

2. Appearance aspect: a traditional high-strength cover plate is single in color and is inadequate to meet the demands on modern individuation.

SUMMARY OF THE INVENTION

In order to overcome the deficiencies in the prior, the technical problem to be solved by the present invention is to provide a glass material, a preparation method thereof and a glass cover plate prepared with the glass material. The technical solution employed to solve the technical problem by the present invention is as follows:

The glass material contains a lithium salt crystalline phase and a phosphate crystalline phase. For the entire material, the crystallinity is 40-95%, the lithium salt crystalline phase accounts for 40-90 wt % of the entire material, and the phosphate crystalline phase accounts for 2-15 wt % of the entire material, wherein the lithium salt crystalline phase is one or more of lithium silicate, lithium disilicate and petalite, and the phosphate crystalline phase is aluminum phosphate or/and aluminum metaphosphate.

Further, crystalline phase combination types contained in the glass material includes the following types in percentage by mass: 5-15% of the lithium silicate, 20-50% of the lithium disilicate, 20-45% of the petalite and 3-10% of the aluminum phosphate; 5-15% of the aluminum phosphate and 10-40% of the lithium disilicate; or 5-15% of the lithium silicate, 10-15% of the aluminum phosphate and 20-50% of the lithium disilicate; or 30-45% of the petalite, 25-45% of the lithium disilicate and 2-5% of the aluminum metaphosphate; or 20-45% of the petalite, 20-40% of the lithium disilicate and 3-15% of the aluminum metaphosphate; or 25-45% of the petalite and 20-45% of the lithium disilicate; or 25-45% of the petalite and 2-5% of the aluminum metaphosphate.

The glass material further contains 1-5 wt % of zirconia.

A coloring agent is further added in the glass material.

The coloring agent is a mixture of CoO, CuO, $MnO_2$, $Cr_2O_3$, NiO, $CeO_2$ and $TiO_2$ and a mixture of CdS and ZnO.

By using the CoO as the coloring agent for preparing blue glass ceramics, the selected content of the CoO does not exceed 3%. If the content exceeds 3%, a greatly influence may be caused on the performance of glasses. If the content is lower than 0.5%, a color of a glass flake is not obvious. Thus, preferably, the content of the CoO is 0.5-3 wt %.

By using the CuO as the coloring agent for preparing green glass ceramics, the selected content of the CuO does not exceed 4%. If the content exceeds 4%, the performance of glasses may be lowered, and color distribution of the glasses is uneven. If the content is lower than 0.5%, a color of a glass flake is not obvious. Thus, preferably, the content of the CuO is 0.5-4 wt %.

By using the $MnO_2$ as the coloring agent for preparing brownish yellow glass ceramics, the selected content of the $MnO_2$ does not exceed 6%. If the content exceeds 6%, the performance of glasses may be lowered. If the content is lower than 1%, a color of a glass flake is not obvious. Thus, preferably, the content of the $MnO_2$ is 1-6 wt %.

By using the $Cr_2O_3$ as the coloring agent for preparing green glass ceramics, the selected content of the $Cr_2O_3$ does not exceed 3%. If the content exceeds 3%, color distribution of glasses is uneven while the performance of the glasses may be lowered. If the content is lower than 0.1%, a color of a glass flake is not obvious. Thus, preferably, the content of the $Cr_2O_3$ is 0.1-3 wt %.

By using the NiO as the coloring agent for preparing brown or green glass ceramics, the selected content of the NiO does not exceed 4%. If the content exceeds 4%, color distribution of glasses is uneven while the performance of the glasses may be lowered. If the content is lower than 0.3%, a color of a glass flake is not obvious. Thus, preferably, the content of the NiO is 0.1-3 wt %.

By using a mixed coloring agent of $CeO_2$ and $TiO_2$ for preparing a yellow glass composition, a usage amount of the $CeO_2$ is within 6%, and the lowest use amount is larger than 0.8%. A combined amount of the mixed coloring agent is 2-8 wt %.

By using a mixed coloring agent of CdS and ZnO, the glasses are opacified with thermal treatment, the content of the CdS does not exceed 4%, and the lowest use amount is larger than 0.6%. A combined amount of the mixed coloring agent is 2.5-9 wt %.

By using $Nd_2O_3$ as the coloring agent for preparing a magenta glass composition, as $Nd_2O_3$ as a rare earth element is relatively light in coloring, the color of the glasses cannot be further darkened much even when the used content exceeds 6%, instead, the cost of the glasses is increased. A lower limit of the content of the $Nd_2O_3$ is 2%. If the content is lower than 2%, a color of a glass flake is light. Thus, preferably, the content of the $Nd_2O_3$ is 2-6 wt %.

A method of preparing the glass material comprises the steps of:

step 1, uniformly mixing the following raw materials in percentage by mass: 68-74% of $SiO_2$, 4-10% of $Al_2O_3$, 8-12% of $Li_2O$, 0.1-3% of $Na_2O$, 0.1-1% of $K_2O$, 3-9% of $P_2O_5$ and 1-6% of $ZrO_2$, and putting a mixture in a platinum or alumina crucible;

step 2, heating the mixture for 10-30 h in an electric furnace at a temperature ranging from 1250° C. to 1450° C. for uniformly melting the mixture, and forming a basic glass plate with a thickness of 0.2-2 mm with a cast ingot cutting method and a rolling process; and step 3, implementing thermal treatment on the obtained basic glass plate in order to conduct nucleation and crystal growth, and preparing the glass material.

In the step 1, the following components are further added in the raw materials in percentage by mass: 0-2% of CaO, 0-1% of BaO, 0-2% of $Sb_2O_3$, 0-3% of MgO, 0-6% of ZnO, 0-5% of $Y_2O_3$, 0-5% of $La_2O_3$, 0-2% of $Eu_2O_3$, 0-2% of $Gd_2O_3$, 0-4% of $TiO_2$, 0.5-3 wt % of CoO, 0.5-4 wt % of CuO, 1-6 wt % of $MnO_2$, 0.1-3 wt % of $Cr_2O_3$, 0.1-3 wt % of NiO, 2-8 wt % of $CeO_2$ and $TiO_2$ and 2.5-9 wt % of CdS and ZnO.

In the step 3, the thermal treatment process comprises the steps of: keeping the basic glass plate for 2-6 h at a temperature of 600-650° C. and then for 2-10 h at a temperature of 690-770° C.

Further, the method further comprises step 4 of: conducting ion strengthening on the prepared glass material. The specific operation comprises the steps of: step 1, soaking the glass material in a $NaNO_3$ molten salt bath for about 5-16 h at a temperature of about 420-460° C. for ion exchange; and step 2, soaking the glass material in a $KNO_3$ molten salt bath for about 2-16 h at a temperature of about 400-460° C. for ion exchange.

Further, a melting temperature in the step 2 is 1450° C., preferably, 1400° C., and more preferably, 1340° C.

Furthermore, the whole size of crystals produced in a glass body after subjected to thermal treatment is smaller than 60 nm, preferably, smaller than 50 nm, and more preferably, smaller than 40 nm.

A glass cover plate product is prepared by the steps of: conducting cutting and polishing processes on the glass material prepared by the above method and preparing a cover plate with a target thickness and size.

Further, the Vickers hardness Hv of the glass cover plate product is 900 kgf/mm$^2$ or above, and more preferably, is 1000 kgf/mm$^2$.

Further, the glass cover plate product cannot be broken when a 102 g steel ball falls onto the glass from 300 mm, preferably, a height is 400 mm, and more preferably, the height is 450 mm or above.

Further, the transmittance of the glass cover plate product is 85% or above in the visible light range, and preferably, is 90% or above.

Further, a compressive stress value CS of a compressive stress layer on the surface of the glass cover plate product is 200 Mpa or above, preferably, is 300 Mpa or above, and more preferably, is 400 Mpa or above.

Further, a depth DOL of a potassium ion exchange layer of the compressive stress layer of the glass cover plate product is 2 μm or above, preferably, is 5 μm or above, and more preferably, is 7 μm or above.

Further, a depth DOC of a sodium ion exchange layer of the compressive stress layer of the glass cover plate product is 70 μm or above, preferably, is 80 μm or above, and more preferably, is 90 μm or above.

$SiO_2$ is an essential component for a glass reticular structure and becomes an essential component for composing a crystalline phase after subjected to thermal treatment on original glasses. If an amount of the $SiO_2$ is smaller than 68%, the obtained glasses cannot obtain a corresponding crystalline phase and crystallinity. Thus, a lower limit of the content of the $SiO_2$ is preferably 68%. On the other hand, by enabling the content of the $SiO_2$ to be 74% or below, over viscosity increase and meltbility weakening may be inhibited. Thus, an upper limit of the content of the $SiO_2$ is preferably 74% or below.

$Al_2O_3$ may form a component for forming the glass reticular structure. As a glass network intermediate and an important component for facilitating stabilization of the structure of the glasses and improvement in chemical durability, the $Al_2O_3$ may further improve the thermal conductivity of the glasses; and the $Al_2O_3$ can also become an essential component for composing the crystalline phase after subjected to thermal treatment on original glasses. However, if the content of the $Al_2O_3$ is smaller than 4%, the best effect cannot be achieved. Thus, a lower limit of the content of the $Al_2O_3$ is 4%. On the other hand, as a melting point of the $Al_2O_3$ is high, if the content exceeds 10%, the meltbility and the devitrification resistance are poor correspondingly. Thus, an upper limit of the content of the $Al_2O_3$ is 10%.

$Na_2O$ is obvious in fluxing action. When chemical strengthening is conducted through ion exchange, the $Na_2O$ in the glass ceramics may be subjected to ion exchange to form a compressive stress layer and is an essential component for forming high-strength glass ceramics, and thus the content of the $Na_2O$ is at least 0.1% or above. However, over introduction may easily cause increase in expansion coefficient of the glasses as well as weakening in thermostability, chemical stability and mechanical strength of the glasses. In composition of the glass ceramics of the present invention, increase of the content of sodium oxide may be against precipitation of required crystalline phases in a glass substrate, and thus the content of the sodium oxide is preferably 3%. Thus, when chemical toughening is conducted through ion exchange, a lower limit of the content of the $Na_2O$ is 0.1%, and an upper limit is 3%.

$K_2O$ is an alternative component for facilitating improvement in meltbility and formability of the glasses, and the effect of the $K_2O$ is similar to $Na_2O$, capable of improving the whiteness and the smoothness of the glasses. In composition of the glass ceramics of the present invention, increase of the content of potassium oxide may be against precipitation of required crystalline phases in a glass substrate, and thus the content of the potassium oxide is preferably 1% or below. When chemical toughening is conducted through ion exchange, potassium contained in the glasses has the effects of improving the compressive stress of the surface and increasing a depth of a stress layer. Thus, a lower limit of the content of the $K_2O$ is 0.1%, and an upper limit is preferably 1%.

$ZrO_2$ has the effect of a nucleating agent in the glass ceramics, can also become an essential component for composing the crystalline phase through thermal treatment on the original glasses and is beneficial to improving the refractive index and the chemical stability of the glasses and lowering the ultraviolet transmitting ability of the glasses. However, if the glasses contain excessive $ZrO_2$, melting of the glasses may be difficult, and the glasses may be easily devitrified. A lower limit of the content of the $ZrO_2$ is preferably 1%, and an upper limit is preferably 6%.

$TiO_2$ is an alternative component for facilitating decrease in melting temperature of the glass ceramics, improvement in refractive index and chemical stability of the glass ceramics and improvement in absorption ability to ultraviolet light. In addition, $TiO_2$ has the effect of a nucleation agent and is beneficial to crystallization in the thermal treatment process. A lower limit of the content of the $TiO_2$ is larger than 0. On the other hand, by enabling the content of the $TiO_2$ to be 4% or below, the melting temperature of the glasses may be decreased, and the crystallization degree may be controlled. Thus, an upper limit of the content of the $TiO_2$ is preferably 4%.

BaO is an alternative component for facilitating improvement in low-temperature melting property of the glasses. When used in a small amount, the BaO assists melting and has the effects of improvement in refractive index, density and chemical stability of the glasses, strong radiation absorption ability and the like. When the amount of the BaO is excessive, clarification may be difficult, secondary bubbles are produced, and the glasses are easily devitrified. Thus, an upper limit of the content of the BaO is preferably 1%. MgO is beneficial to lowering the viscosity of the glasses and inhibiting crystallization of the original glasses, also has the effect of improving the low-temperature melting property and is an alternative component. A lower limit of the content of the MgO is larger than 0. However, if the content of the MgO is over high, the devitrification resistance may be weakened, non-ideal crystals may be obtained after crystallization, and the performance of the glass ceramics is lowered, so that an upper limit of the content of the MgO is preferably 3%.

ZnO has the abilities of improving the melting property of the glasses and improving the chemical stability of the glasses and is an alternative component. A lower limit of the content of the ZnO is preferably larger than 0. On the other hand, an upper limit of the content of the ZnO is controlled to be 6%, so that the required opacification effect may be obtained, and the influence on mechanical properties of the glasses is little.

$Y_2O_3$ and $La_2O_3$ are alternative components for facilitating the meltbility and the formability of the glasses and both capable of improving the hardness, the chemical stability and the thermal conductivity of the glass ceramics. With addition of the $Y_2O_3$ and the $La_2O_3$ in a small amount, the melting temperature of the glasses may be lowered, and a temperature of a liquid phase is decreased to a certain degree. However, if the content of the $Y_2O_3$ is excessive, devitrification of the glasses may be caused. Thus, the content of the $Y_2O_3$ or the $La_2O_3$ is 5%.

$Eu_2O_3$ and $Gd_2O_3$ are alternative components for facilitating the meltbility and the formability of the glasses. Through the introduction, the $Eu_2O_3$ and the $Gd_2O_3$ may both obviously improve the melting effect of the glasses and are beneficial to formation of the glasses. More importantly, in presence of the $Li_2O$, the $Na_2O$, the MgO and the ZnO, by introducing $Eu_2O_3$ or $Gd_2O_3$ for exerting synergistic effect with the above three components, the components mutually support functionally, further have the effects of improving the paramagnetism of the glass ceramics, lowering the magnetic loss and improving the mechanical properties of the glass ceramics and are beneficial to being used as a protective material of a mobile terminal. An upper limit of an introduction amount of the $Eu_2O_3$ or the $Gd_2O_3$ is preferably 2%. Introduction of $Sb_2O_3$, as a clarifying agent of the glasses, is beneficial to lowering an amount of bubbles in a melt and improving the clarifying effect of the glass body and is crucial to prepare the glass ceramics satisfying use of the mobile terminal. An upper limit of an introduction amount of the $Sb_2O_3$ is preferably 2%.

$Li_2O$ is a component for improving the low-temperature meltbility and the formability of the glasses and may become an essential component required for crystalline phase composition through thermal treatment on the original glasses. However, if the content of the $Li_2O$ is smaller than 8%, the crystallization effect is poor, while the melting difficulty is increased. On the other hand, if the content of the $Li_2O$ is excessive, the obtained crystals are easily unstable and largened, the chemical durability of the glasses is lowered, or the average coefficient of linear expansion of the glasses is raised. Thus, an upper limit of the content of the $Li_2O$ is preferably 12%. When chemical toughening is conducted through ion exchange, if a system contains the $Li_2O$ component, a large content of lithium is also very effective to the aspect of forming a relatively deep compressive stress layer.

$P_2O_5$ can exert the effects of a network former and the nucleating agent in the glasses and is also beneficial to lowering a melting temperature of the glasses. Under a low concentration, $P_2O_5$ is the nucleating agent in the crystallization process mainly and exerts the effect of controlling the size of crystals. After the concentration of the $P_2O_5$ is increased, the $P_2O_5$ participates to formation of a glass network. Due to a strong electric field produced by lone pair electrons in a P—O structure, a structure of a silica tetrahedron in the glass network changes. In this glass system, the $P_2O_5$ is also an essential component for precipitating the phosphate crystalline phase and is also capable of increasing abbe number and improving the ultraviolet transparency and the transparency. When basic glasses do not contain $P_2O_5$ or the content of the $P_2O_5$ is too low, the basic glasses cannot entirely crystallized in the microcrystallization process, so that atomization is caused on the surface of the basic glasses, and the glass ceramics with uniform crystallization is difficult to obtain.

In this system, on one hand, by increasing the content of the $P_2O_5$ a part of $[SiO_4]$ silica tetrahedron is converted to $[SiO_6]$ octahedral structure. In the crystallization process, in the glasses, $Li^+$ is combined with a silica structure to form $LiSiO_3$ crystals, and a $Li_2Si_2O_5$ crystalline phase is formed finally. As crystallization proceeds, $Li_2SiO_3$ or $Li_2Si_2O_5$ is further combined with an Al—O structure to form a $Li[AlSi_4O_{10}]$ petalite crystalline phase. On the other hand, by lowering the content of lithium in the glass composition system at the same time, more Al—O structures which more easily form the petalite originally and more P—O structures which are weak in a glass network form a part of the aluminum metaphosphate and aluminum phosphate crystalline phases, so that the purpose of improving the mechanical properties and the machining properties of the glass ceramics with multiple crystalline phases is achieved. However, if the content of the $P_2O_5$ in the system is too large, phase separation is easily caused to enable the devitrification resistance of the glasses to be weakened and batch production of the glasses to be poor. Thus, the content of the $P_2O_5$ is preferably 3-9 wt %.

For the present invention, by lowering the content of the lithium and increasing the content of the phosphorus in the raw materials for preparing the glass material at the same time and combining with a preparation process, the contents of the lithium salt crystalline phase and the phosphor salt crystalline phase in the glass material are controlled, the problems of large brittleness, poor toughness and the like of the glass ceramics with the lithium disilicate as a main crystalline phase are solved, and the mechanical properties of a product are improved compared with inventions and products on the existing market. For the glass material subjected to thermal treatment, combinations with various crystal types may be formed, and thus a corresponding crystalline phase may be selected according to the actual needs. The glass material may have different personalized colors by selectively adding various coloring agents. In the present invention, through repeated tests and researches, for specific components for composing a glass ceramic product, the contents of the specific components and a content ratio are stipulated as specific values, and several specific crystalline phases precipitate from the specific components, so that the glass ceramics or a glass product of the present invention is obtained with a relatively low cost. After the glass material of the present invention is toughened, the Vickers hardness (Hv) is 900 $kgf/mm^2$ or above. The glass material or substrate of the present invention is suitable for protective members such as mobile terminal equipment and optical equipment and has high hardness and strength. Furthermore, the present invention may also be used for other decorations such as outer frame members of portable electronic equipment.

DETAILED DESCRIPTION OF THE INVENTION

Figure 1:
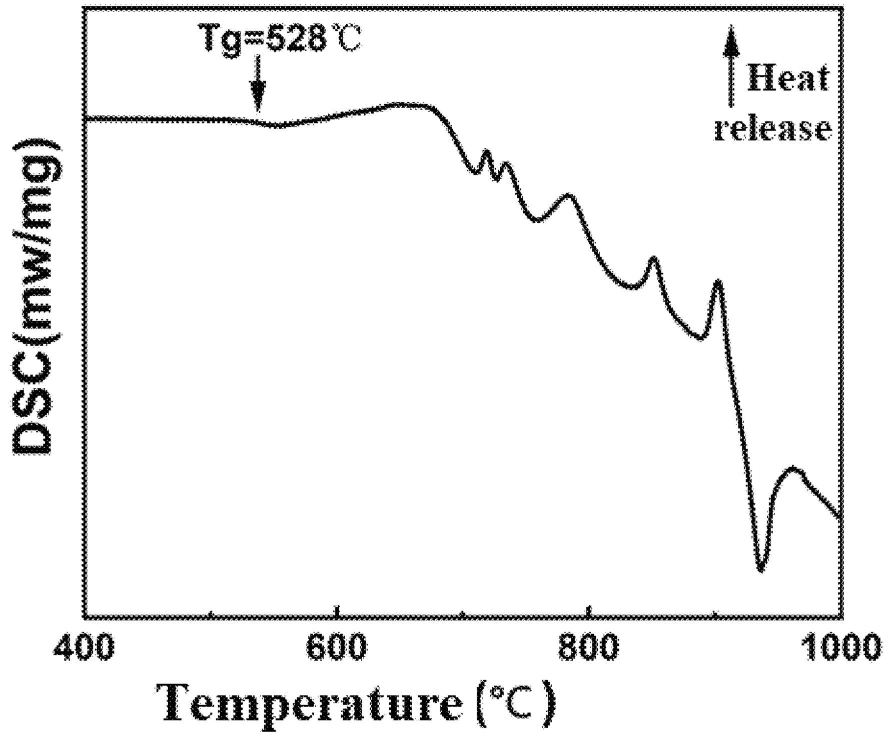
FIG. 1 is a curve of differential scanning calorimetry (DSC) for measuring Embodiment 1.
Figure 2:
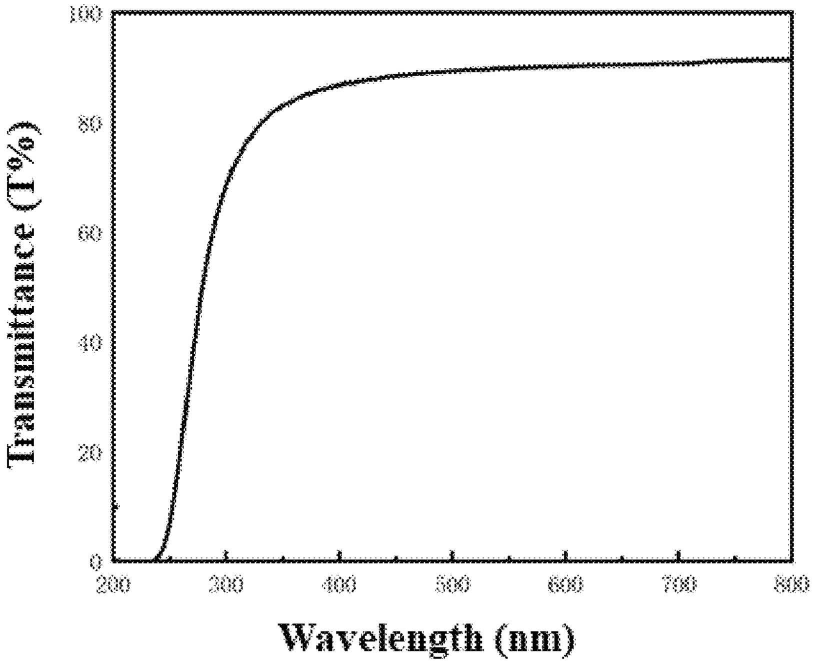
FIG. 2 is a curve of the transmittance for measuring Embodiment 2.
Figure 3:
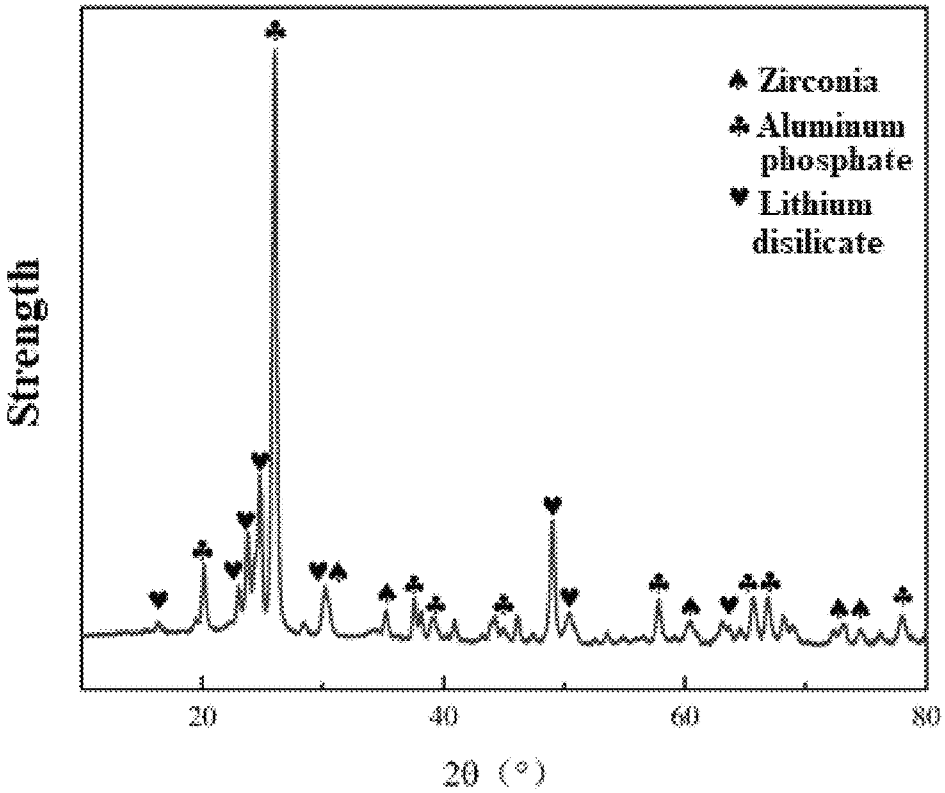
FIG. 3 is an XRD pattern for measuring Embodiment 1.
Figure 4:
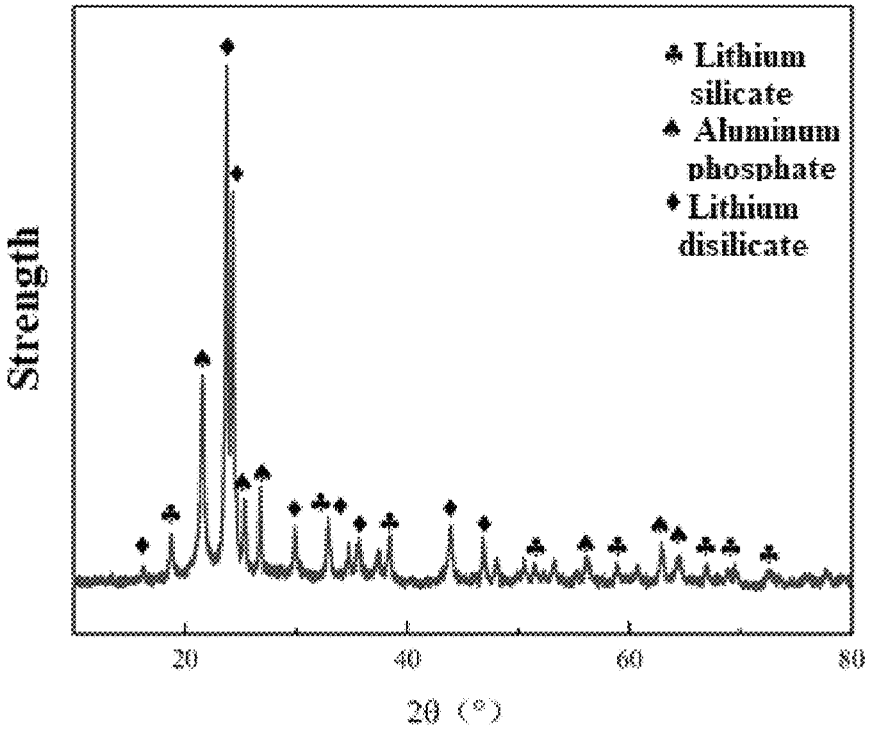
FIG. 4 is an XRD pattern for measuring Embodiment 2.
Figure 5:
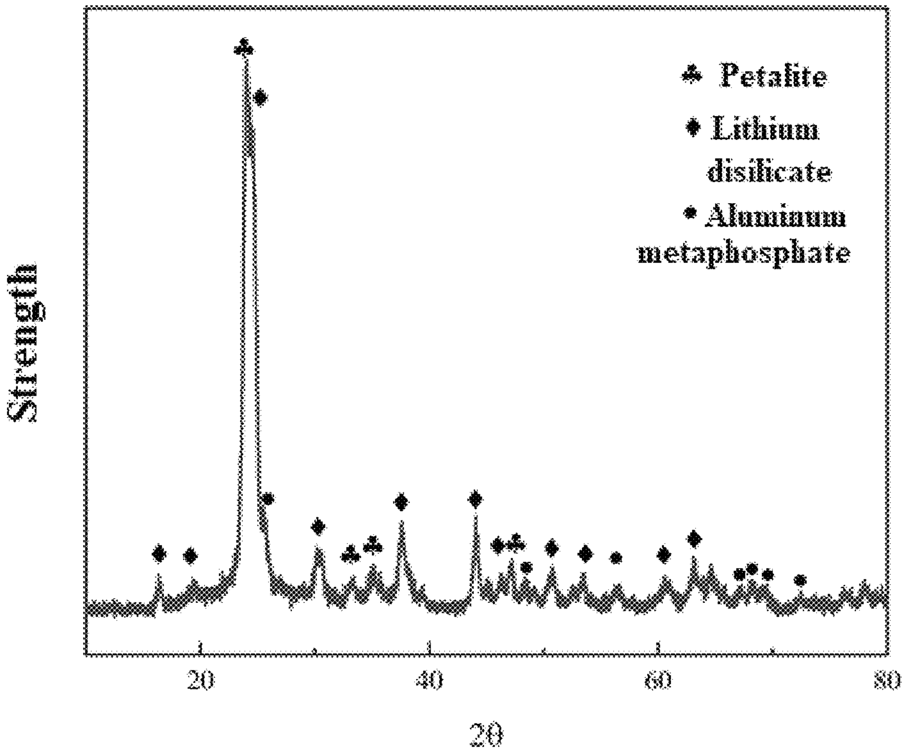
FIG. 5 is an XRD pattern for measuring Embodiment 3.
Figure 6:
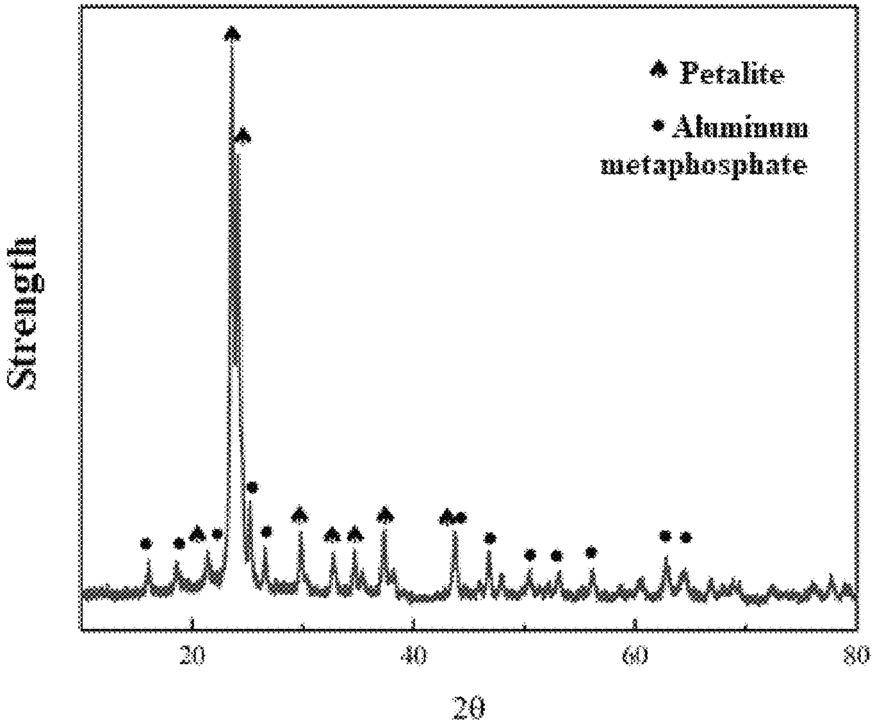
FIG. 6 is an XRD pattern for measuring Embodiment 4.
Figure 7:
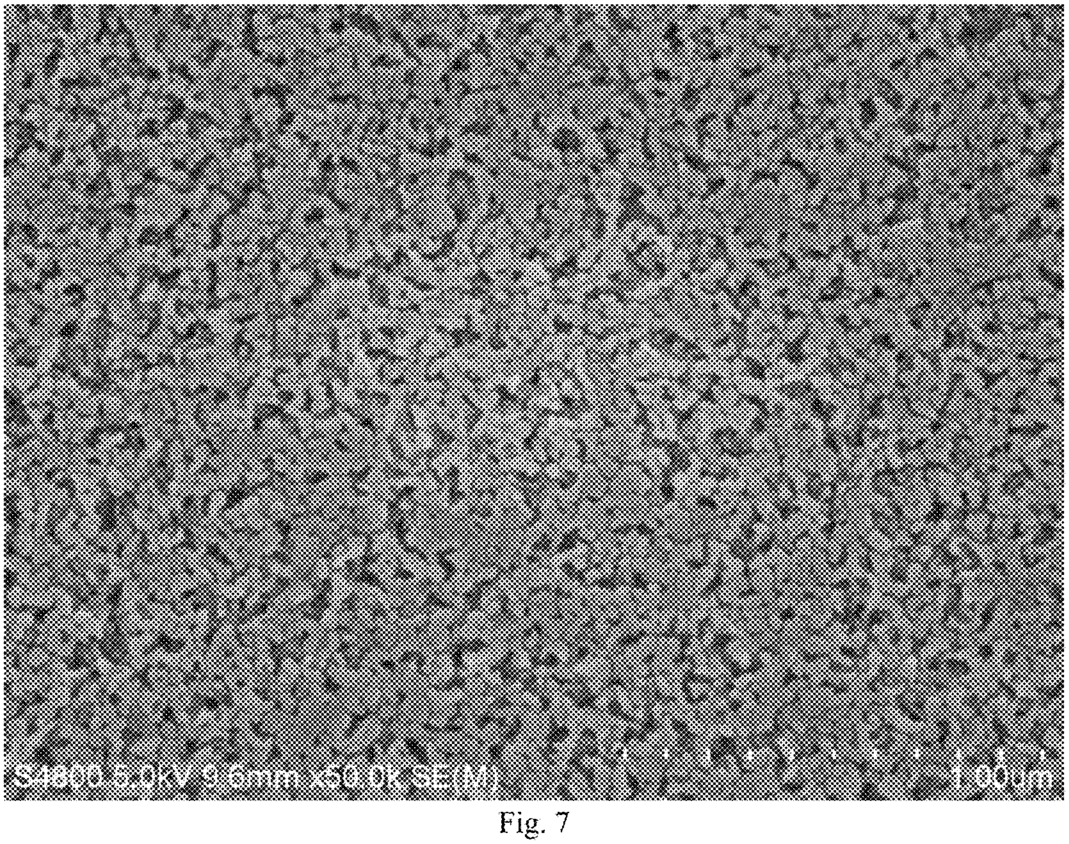
FIG. 7 measures an SEM morphology of crystals after Embodiment 3 is corroded by HF.
Figure 8:
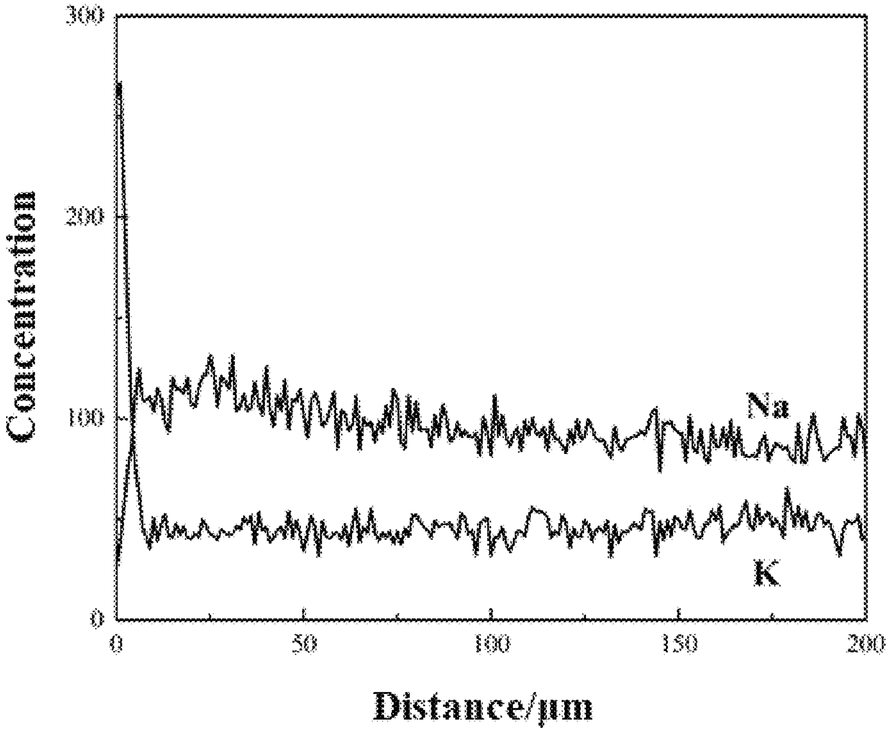
FIG. 8 measures line scanning of energy spectrum of potassium and sodium elements on a section of Embodiment 3.
Figure 9:
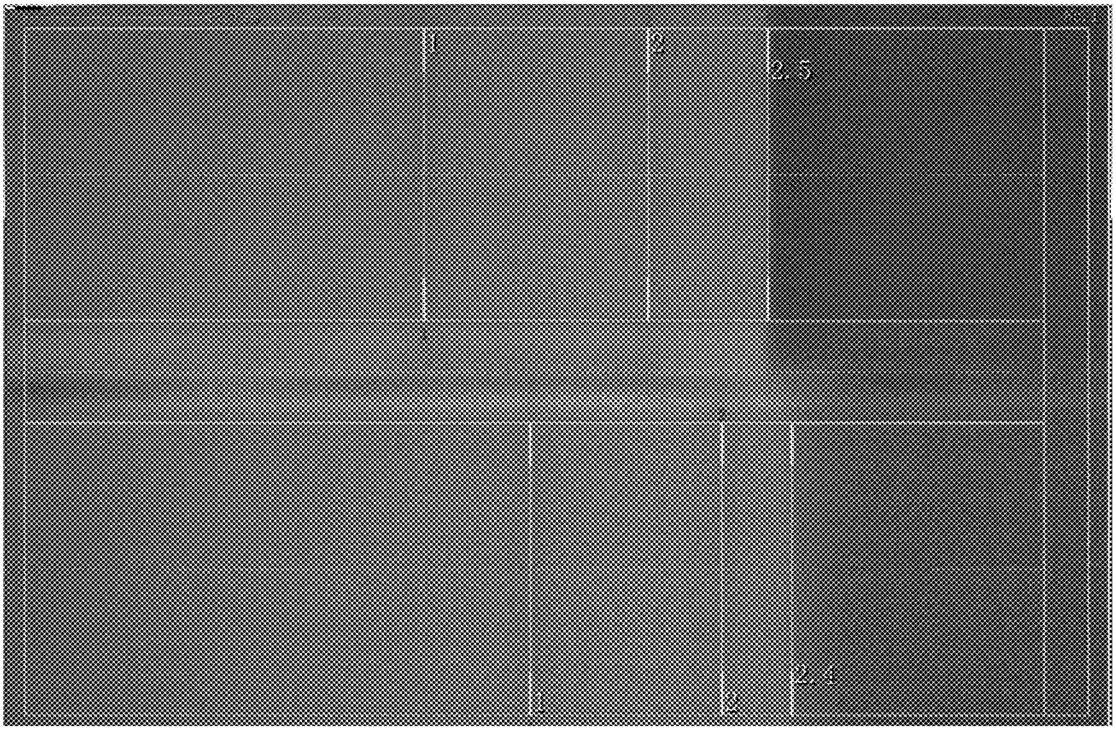
FIG. 9 is a display picture of FSM-6000 for measuring Embodiment 3.
Figure 10:
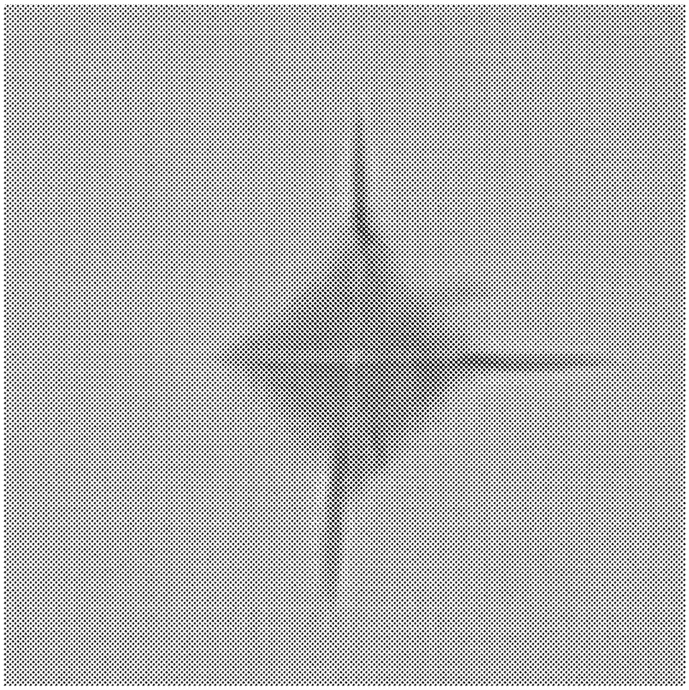
FIG. 10 is impressions for measuring a hardness test for measuring Embodiment 3.
Figure 11:
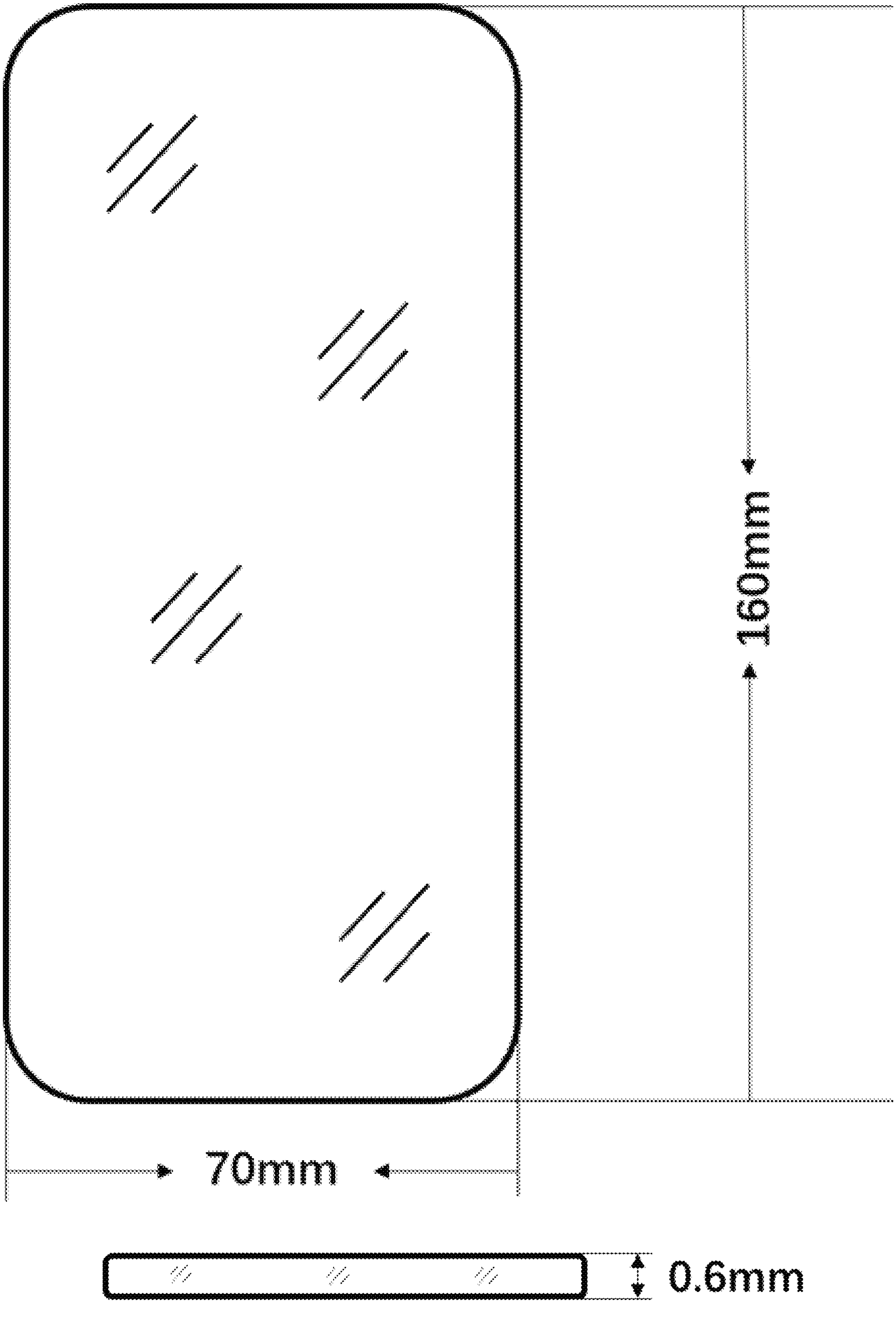
FIG. 11 is a glass size schematic view for a ball falling test.

A composition range of various components of the glass ceramics of the present invention is described below. In this description, the contents of various components are expressed by employing a weight percentage relative to a glass material total weight of the composition converted into oxides, unless otherwise noted. Here, the "composition converted into oxides" refers to that under the condition that oxides, mixed salts and the like which are used as the raw materials of the composition of the glass ceramics of the present invention are totally decomposed and converted into oxides when molten, the material total weight of the oxides is taken as 100%.

EMBODIMENT

Embodiment 1

Step 1, Weighing and Mixing of Components

According to various components and mass percentages thereof listed in example 1 in Table 1, corresponding raw materials were selected and uniformly mixed, and a uniformly mixed mixture was put in a platinum or alumina crucible.

Step 2, Preparation of a Basic Glass Plate

According to the degree of difficulty of melting of the glass composition, heat preservation was conducted on the mixture for 20 h in an electric furnace at a temperature of 1450° C., the mixture was uniformly molten, and a basic glass plate with a thickness of 0.1 mm was formed with a cast ingot cutting method.

Step 3, Thermal Treatment for Crystallization

Thermal treatment for crystallization was conducted on the obtained basic glass plate, the specific method of which comprises the steps that thermal insulation was performed on the basic glass plate for 2 h at 650° C. for nucleation and then for 8 h at 760° C. for crystal growth, and then furnace cooling was conducted to prepare glass ceramics. Process systems of thermal treatment for crystallization of the glasses of other examples are as shown in the table.

Step 4, Machining of the Glass Ceramics

A prepared glass ceramic sheet was subjected to treatment with processes of cutting, edging, polishing and the like by using a machine, and a glass sheet in a specified size and with a thickness of 160×70×0.6 mm was prepared.

Step 5, Chemical Strengthening of the Glass Ceramics

A compressive stress layer was formed on the surface of the glasses with a high-temperature ion exchange method to achieve strengthening of a glass cover plate. A two-step high-temperature ion exchange method was uniformly selected for strengthening and comprises the following specific steps that step 1, the glass material was soaked in a $NaNO_3$ molten salt bath for about 8 h at a temperature of 450° C.; and step 2, the glass material was soaked in a $KNO_3$ molten salt bath for 2 h at a temperature of 400° C.

Performance tests were conducted on the obtained glass material cover plate product, and each performance data is shown as corresponding data in Table 1.

Embodiment 2

Step 1, Weighing and Mixing of Components

According to various components and mass percentages thereof listed in example 2 in Table 1, corresponding raw materials were selected and uniformly mixed, and a uniformly mixed mixture was put in a platinum crucible.

Step 2, Preparation of a Basic Glass Plate

According to the degree of difficulty of melting of the glass composition, heat preservation was conducted on the mixture for 20 h in an electric furnace at a temperature of 1420° C., the mixture was uniformly molten, and a basic glass plate with a thickness of 2.0 mm was formed with a cast ingot cutting method.

Step 3, Thermal Treatment for Crystallization

Thermal treatment for crystallization was conducted on the obtained basic glass plate, the specific method of which comprises the steps that thermal insulation was performed on the basic glass plate for 4 h at 630° C. for nucleation and then for 3 h at 730° C. for crystal growth, and then furnace cooling was conducted to prepare glass ceramics.

Step 4, Machining of the Glass Ceramics

A prepared glass ceramic sheet was subjected to treatment with processes of cutting, edging, polishing and the like by using a machine, and a glass sheet in a specified size and with a thickness of 160×70×0.6 mm was prepared.

Performance tests were conducted on the obtained glass material cover plate product, and each performance data is shown as corresponding data in Table 1.

For crystalline phases of the glass ceramics before high-temperature ion strengthening in Embodiments 1-14, by using an X-ray diffractometer and comparing with a standard PDF card, corresponding crystalline phases in the glass ceramics were analyzed, and corresponding crystallinity was calculated.

Average grain size: determination was conducted by using a scanning electron microscope, surface treatment was conducted on the glass ceramics in HF acid, coating with gold spraying was conducted on the surfaces of the glass ceramics, surface scanning was conducted under the scanning electron microscope to observe diameters of grains, average diameter sizes of all the grains are added together, and a sum was divided by an amount of crystalline grains in an image.

Transmittance: test was conducted by using an ultraviolet and visible spectrophotometer. Vickers hardness: measurement was conducted by using Vickers, wherein a loading force was 200 g, and a loading time was 15 s.

CS: that is the surface compressive stress layer formed by potassium ions, and determination was conducted by using a glass surface stress gauge FSM-6000.

DOC: that is a depth of a sodium ion strengthened layer, and determination was conducted by using a glass surface stress gauge SLP-1000 from Japan ORIHARA.

DOL: that is a depth of a potassium ion strengthened layer, and determination was conducted by using a glass surface stress gauge FSM-6000 from Japan ORIHARA.

Ball falling height: that is a maximal ball falling height obtained in such a way that a strengthened glass ceramic plate in a size of 160×70×0.8 mm was put on a rubber frame for fixing after two surfaces of the strengthened glass ceramic plate were polished, 102 g steel ball fallen down from a specified height, and the glass sheet was not broken and could bear the impact. Particularly, test data recorded as 380-420 mm in the embodiments expresses the impact borne by the glass plate without being broken although the steel ball falls onto the glass sheet from a height of 400 mm.

Colors in the embodiments are those of corresponding glass plates, obtained through visual inspection.

TABLE 1

| Component | Embodiment | | | | | | |
|---|---|---|---|---|---|---|---|
| (wt %) | 1 | 2 | 3 | 4 | 5 | 6 | 7 |
| $SiO_2$ | 68 | 69 | 70 | 71 | 72 | 73 | 74 |
| $Al_2O_3$ | 10 | 7 | 9 | 5 | 6.5 | 7.2 | 5.5 |
| $TiO_2$ | 0 | 1.2 | 1.6 | 1.2 | 2 | 0.1 | 0.5 |
| CaO | 0.5 | 0.8 | 1 | 0.5 | 0.2 | 0.1 | 0.2 |
| $Li_2O$ | 10 | 9 | 8 | 8 | 9 | 10 | 12 |
| $Na_2O$ | 1 | 3 | 1.5 | 1.8 | 1 | 0.2 | 0.5 |
| $K_2O$ | 0.1 | 0.3 | 0.4 | 0.5 | 0.7 | 0.1 | 0.4 |
| $P_2O_5$ | 3 | 4.5 | 5 | 9 | 6 | 3 | 4 |
| $ZrO_2$ | 5 | 2 | 1 | 1 | 1 | 5 | 1.8 |
| BaO | 0 | 1 | 0.5 | 0 | 0 | | 0 |
| $Sb_2O_3$ | 2 | 1.8 | 2 | 2 | 1.5 | 1.3 | 1.1 |
| MgO | 0.2 | 0.2 | | | | | |

TABLE 1-continued

| Component (wt %) | Embodiment 1 | 2 | 3 | 4 | 5 | 6 | 7 |
|---|---|---|---|---|---|---|---|
| ZnO | 0.2 | | | | | | |
| $Y_2O_3$ | | 0.2 | | | | | |
| $La_2O_3$ | | | | 0.2 | | | |
| $Eu_2O_3$ | | | | 0.2 | | | |
| $Gd_2O_3$ | | | | | 0.1 | | |
| $SiO_2/Li_2O$ | 6.8 | 7.7 | 8.8 | 8.9 | 8.0 | 7.3 | 6.2 |
| $ZrO_2 + P_2O_5 + TiO_2$ | 8 | 7.7 | 7.6 | 7.8 | 9 | 8.1 | 6.3 |
| Melting process | 1450° C. 20 h | 1420° C. 20 h | 1400° C. 20 h | 1430° C. 30 h | 1360° C. 20 h | 1340° C. 30 h | 1400° C. 25 h |
| Nucleation process | 650° C. 2 h | 630° C. 4 h | 620° C. 4 h | 620° C. 4 h | 620° C. 4 h | 630° C. 4 h | 620° C. 4 h |
| Crystallization process | 760° C. 8 h | 730° C. 3 h | 720° C. 3 h | 700° C. 6 h | 700° C. 6 h | 720° C. 3 h | 720° C. 3 h |
| Crystalline phase | Zirconia Aluminum phosphate Lithium disilicate | Aluminum silicate Aluminum phosphate Lithium disilicate | Petalite Lithium disilicate Aluminum metaphos-phate | Petalite Aluminum metaphos-phate | Petalite Aluminum metaphos-phate | Petalite Lithium disilicate Aluminum metaphos-phate | Petalite Lithium disilicate Aluminum metaphor-sphate |
| CS (MPa) | 400 | 300 | 380 | 400 | 360 | 395 | 432 |
| DOC (μm) | 100 | 95 | 110 | 105 | 90 | 110 | 93 |
| DOL (μm) | 7 | 8 | 8 | 7 | 6 | 8 | 7 |
| Vickers hardness ($Kgf/mm^2$) | 1055 | 950 | 970 | 925 | 930 | 950 | 1000 |
| Ball falling height (mm) | 400 | 400 | 400 | 400 | 400 | 450 | 450 |
| Color | Opacified | Transparent | Transparent | Transparent | Transparent | Transparent | Transparent |

TABLE 2

| Component | Embodiment 1 | 2 | 3 | 4 | 5 | 6 | 7 |
|---|---|---|---|---|---|---|---|
| $SiO_2$ | 68 | 69 | 70 | 71 | 70 | 71 | 73 |
| $Al_2O_3$ | 9 | 6 | 8 | 5 | 6 | 5 | 5 |
| $TiO_2$ | 0.3 | 0.1 | 0.5 | 0.8 | 1 | 0 | 0.6 |
| CaO | 0.4 | 0.8 | 1 | 0.5 | 0.8 | 0.2 | 0.6 |
| $Li_2O$ | 9 | 11.5 | 12 | 12 | 9 | 12 | 11 |
| $Na_2O$ | 0.3 | 0.5 | 0.7 | 1.5 | 1 | 1.5 | 0.5 |
| $K_2O$ | 0.1 | 0.3 | 0.4 | 0.7 | 0.5 | 0.4 | 0.2 |
| $P_2O_5$ | 9 | 3.5 | 4 | 6 | 6 | 5 | 3 |
| $ZrO_2$ | 1.5 | 5 | 1 | 1 | 3 | 3.5 | 4.6 |
| BaO | 0 | 1 | 0.4 | 0 | 0.2 | 0 | |
| $Sb_2O_3$ | 2 | 1.8 | 2 | 1.5 | 1.5 | 1.4 | 1.5 |
| MgO | 0.2 | 0.5 | | | 1 | | |
| ZnO | 0.2 | | | | 0 | | |
| $SiO_2/Li_2O$ | 7.6 | 6.0 | 5.8 | 5.9 | 7.8 | 5.9 | 6.6 |
| $ZrO_2 + P_2O_5 + TiO_2$ | 10.8 | 8.6 | 5.5 | 7.8 | 10 | 8.5 | 8.2 |
| Melting process | 1450° C. 20 h | 1420° C. 20 h | 1380° C. 20 h | 1400° C. 30 h | 1360° C. 20 h | 1400° C. 30 h | 1400° C. 25 h |
| Melting temperature/° C. | 1450° C. | 1450° C. | 1340° C. | 1360° C. | 1380° C. | 1400° C. | 1450° C. |
| Nucleation process/° C. | 640° C. 2 h | 630° C. 4 h | 620° C. 5 h | 630° C. 4 h | 630° C. 4 h | 620° C. 4 h | 630° C. 6 h |
| Crystallization process/° C. | 730° C. 4 h | 740° C. 3 h | 720° C. 3 h | 700° C. 6 h | 720° C. 3 h | 720° C. 3.5 h | 760° C. 4 h |
| Crystalline phase | Petalite Lithium disilicate Aluminum metaphosphate | Lithium silicate Lithium disilicate Aluminum phosphate | Petalite Lithium disilicate Aluminum metaphosphate | Petalite Lithium disilicate Aluminum metaphosphate | Petalite Lithium disilicate Aluminum metaphosphate | Lithium silicate Lithium disilicate Aluminum phosphate | Lithium silicate Lithium disilicate Aluminum phosphate |
| CS (MPa) | 380 | 390 | 410 | 420 | 400 | 420 | 430 |
| DOC (μm) | 100 | 105 | 105 | 100 | 98 | 93 | 95 |
| DOL (μm) | 9 | 10 | 9 | 9 | 8 | 7 | 8 |
| Vickers hardness ($Kgf/mm^2$) | 1000 | 950 | 970 | 930 | 950 | 1000 | 1010 |
| Ball falling height (mm) | 400 | 380 | 400 | 390 | 400 | 420 | 405 |
| Color | Transparent | Transparent | Transparent | Transparent | Transparent | Transparent | Transparent |

TABLE 3

| | Embodiment | | | | | | |
|---|---|---|---|---|---|---|---|
| Component | 8 | 9 | 10 | 11 | 12 | 13 | 14 |
| $SiO_2$ | 70.5 | 69 | 70 | 71 | 70 | 68 | 70 |
| $Al_2O_3$ | 8 | 7 | 6 | 9 | 6.5 | 6 | 4.5 |
| $TiO_2$ | 0 | 1.2 | 1.6 | 1.5 | 4 | 2 | 0 |
| CaO | 0.5 | 0.8 | 1 | 1.4 | 0.5 | 1.8 | 0.5 |
| $Li_2O$ | 12 | 9 | 9 | 8 | 9 | 8 | 12 |
| $Na_2O$ | 1 | 2.5 | 1.5 | 1.8 | 1 | 1.5 | 0.5 |
| $K_2O$ | 0.1 | 0.3 | 0.4 | 0.5 | 0.6 | 1 | 0.4 |
| $P_2O_5$ | 3.5 | 4.5 | 3 | 3 | 4 | 3 | 5 |
| $ZrO_2$ | 1 | 2 | 1 | 1.3 | 1 | 1 | 2 |
| BaO | 0 | 1 | 0.5 | 0 | 0 | 0.2 | 0 |
| $Sb_2O_3$ | 2 | 1.8 | 2 | 2 | 1.5 | 1.3 | 1.1 |
| MgO | 0.2 | 0.2 | | | | | |
| ZnO | 0.2 | | | | | 5 | |
| CoO | 1 | | | | 0.2 | | |
| CuO | | 0.7 | | | | | |
| $MnO_2$ | | | 4 | | | | |
| $Cr_2O_3$ | | | | 0.5 | 1 | | |
| NiO | | | | | 0.7 | | |
| $CeO_2$ | | | | | | | |
| CdS | | | | | | 1.2 | |
| $Nd_2O_3$ | | | | | | | 4 |
| $SiO_2/Li_2O$ | 79.5 | 78 | 77 | 80.3 | 77.5 | 75 | 76.5 |
| $ZrO_2 + P_2O_5 + TiO_2$ | 5.9 | 7.7 | 7.8 | 8.9 | 7.8 | 8.5 | 5.4 |
| Melting temperature | 1430°C. 20 h | 1420°C. 20 h | 1350°C. 25 h | 1420°C. 25 h | 1350°C. 20 h | 1340°C. 15 h | 1340°C. 20 h |
| Nucleation process | 620°C. 4 h | 620°C. 4 h | 620°C. 4 h | 620°C. 4 h | 620°C. 4 h | 620°C. 4 h | 620°C. 4 h |
| Crystallization process | 720°C. 3 h | 720°C. 3 h | 720°C. 3 h | 720°C. 3 h | 720°C. 3 h | 720°C. 3 h | 720°C. 3 h |
| Crystalline phase | Petalite Lithium disilicate Aluminum metaphosphate | Petalite Lithium disilicate Aluminum metaphosphate | Petalite Lithium disilicate Aluminum metaphosphate | Petalite Lithium disilicate Aluminum metaphosphate | Petalite Lithium disilicate Aluminum metaphosphate | Petalite Cadmium sulfide Aluminum metaphosphate | Petalite Lithium disilicate Aluminum metaphosphate |
| CS (MPa) | 400 | 300 | 380 | 410 | 380 | 385 | 420 |
| DOC (μm) | 100 | 95 | 110 | 105 | 88 | 91 | 120 |
| DOL (μm) | 7 | 8 | 8 | 7 | 9 | 7 | 8 |
| Vickers hardness ($Kgf/mm^2$) | 950 | 950 | 950 | 950 | 950 | 1000 | 950 |
| Ball falling height (mm) | 400 | 400 | 350 | 400 | 400 | 400 | 400 |
| Color | | | | | | | |
| Color | Blue | Green | Brownish yellow | Green | Opacifying green | White | Lavender |

The above are only embodiments of the present invention and do not limit the patent scope of the present invention. Any equivalent structure or equivalent process modification used according to the contents of the description and accompanying drawings in the present invention, no matter whether it is directly or indirectly used in any other related technical field, should be included within the patent protection scope of the present invention.

The invention claimed is:

1. A method of preparing a glass material, comprising the steps of:

step 1, uniformly mixing the following raw materials in percentage by mass: 68-74% of $SiO_2$, 4-10% of $Al_2O_3$, 8-12% of $Li_2O$, 0.1-3% of $Na_2O$, 0.1-1% of $K_2O$ and 9% of $P_2O_5$, and putting a mixture in a platinum or alumina crucible;

step 2, heating the mixture for 10-30 h in an electric furnace at a temperature ranging from 1250° C. to 1450° C. for uniformly melting the mixture, and forming a basic glass plate with a thickness of 0.2-2 mm with a cast ingot cutting method and a rolling process; and step 3, implementing thermal treatment on the obtained basic glass plate in order to conduct nucleation and crystal growth, and preparing the glass material, wherein in the step 1, the following components are further added in the raw materials in percentage by mass: 1-6% of $ZrO_2$, 0-2% of CaO, 0-1% of BaO, 0-2% of $Sb_2O_3$, 0-3% of MgO, 0-6% of ZnO, 0-5% of $Y_2O_3$, 0-5% of $La_2O_3$, 0.2-2% of $Eu_2O_3$, 0-2% of $Gd_2O_3$ and 0-4% of $TiO_2$, wherein the glass material produced by the method comprises a lithium salt crystalline phase and a phosphate crystalline phase, wherein a crystallinity of the entire glass material is 40-95%, the lithium salt crystalline phase accounts for 40-90 wt % of the entire glass material, and the phosphate crystalline phase accounts for 2-15 wt % of the entire glass material, wherein the lithium salt crystalline phase is one or more of lithium silicate, lithium disilicate and petalite, and wherein the phosphate crystalline phase is aluminum phosphate or/and aluminum metaphosphate.

2. The method of preparing the glass material according to claim 1, further comprising step 4, conducting ion strengthening on the prepared glass material, wherein the step 4 comprises soaking the glass material in a $NaNO_3$ molten salt bath for 5-16 h at a temperature of about 420-460° C. for ion exchange; and soaking the glass material in a $KNO_3$ molten salt bath for about 2-16 h at a temperature of about 400-460° C. for ion exchange.

3. The method of preparing the glass material according to claim 1, wherein in the step 3, the thermal treatment process comprises the steps of: keeping the basic glass plate for 2-6 h at a temperature of 600-650° C. and then for 2-10 h at a temperature of 690-770° C.

* * * * *